US007912321B1

(12) United States Patent
Simonson

(10) Patent No.: US 7,912,321 B1
(45) Date of Patent: Mar. 22, 2011

(54) IMAGE REGISTRATION WITH UNCERTAINTY ANALYSIS

(75) Inventor: Katherine M. Simonson, Cedar Crest, NM (US)

(73) Assignee: Sandia Corporation, Albuquerque, NM (US)

( * ) Notice: Subject to any disclaimer, the term of this patent is extended or adjusted under 35 U.S.C. 154(b) by 1064 days.

(21) Appl. No.: 11/305,903

(22) Filed: Dec. 19, 2005

(51) Int. Cl.
*G06K 9/00* (2006.01)
*G06K 9/50* (2006.01)
*G06K 9/32* (2006.01)

(52) U.S. Cl. ......... 382/294; 382/103; 382/199; 382/296

(58) Field of Classification Search .......... 382/128–132, 382/199, 190, 293–294
See application file for complete search history.

(56) References Cited

U.S. PATENT DOCUMENTS

| 5,115,477 | A | * | 5/1992 | Groezinger | 382/199 |
| 5,495,540 | A | * | 2/1996 | Frankot et al. | 382/294 |
| 5,640,200 | A | | 6/1997 | Michael | |
| 5,848,198 | A | * | 12/1998 | Penn | 382/276 |
| 6,009,212 | A | * | 12/1999 | Miller et al. | 382/294 |
| 6,553,152 | B1 | * | 4/2003 | Miller et al. | 382/294 |
| 6,738,532 | B1 | | 5/2004 | Oldroyd | |
| 6,798,897 | B1 | | 9/2004 | Rosenberg | |
| 2004/0156561 | A1 | * | 8/2004 | Yu-Chuan et al. | 382/298 |

OTHER PUBLICATIONS

Gut et al "Edge-based robust image registration for incomplete and partly erroneous data", Proceedings of the 9th International Conference on Computer Analysis of Images and Patterns, pp. 309-316 Year of Publication: 2001.*

Karl C. Walli, "Automated Multisensor Image Registration," aipr, p. 103, 32nd Applied Imagery Pattern Recognition Workshop (AIPR'03), 2003.*
Jobse et al, A new algorithm for the registration of portal images to planning images in the verification of radiotherapy, as validated in prostate treatments, Med. Phys. 30 .9., Sep. 2003.*
Wang et al, "Objective Assessment of Image Registration Results Using Statistical Confidence Intervals" IEEE Transactions on Nuclear Science, vol. 48, No. 1, Feb. 2001.*
Hero et al,"Consistency Set Estimation for PET Image Reconstruction", Proc. of Conf. on Information Sciences and Systems Johns Hopkins Univ Mar. 24-26, 1993.*
S. Erturk, "Image sequence stabilization based on Kalman filtering of frame positions," Electronic Letters, Sep. 2001, vol. 37, No. 20, pp. 1217- .
J. Michael Fitzpatrick et al, "The Distribution of Target Registration Error in Rigid-Body Point-Based Registration", IEEE Transactions on Medical Imaging, vol. 20 No. 9, Sep. 2001, pp. 917-927.
David T. Gregorich et al, "Verification of AIRS Boresight Accuracy Using Coastline Detection", IEEE Transactions on Geoscience and Remote Sensing, Feb. 2003, vol. 41, No. 2, pp. 298-302.

(Continued)

*Primary Examiner* — Vu Le
*Assistant Examiner* — Andrae S Allison
(74) *Attorney, Agent, or Firm* — Carol I Ashby

(57) ABSTRACT

In an image registration method, edges are detected in a first image and a second image. A percentage of edge pixels in a subset of the second image that are also edges in the first image shifted by a translation is calculated. A best registration point is calculated based on a maximum percentage of edges matched. In a predefined search region, all registration points other than the best registration point are identified that are not significantly worse than the best registration point according to a predetermined statistical criterion.

16 Claims, 11 Drawing Sheets

OTHER PUBLICATIONS

Charles S. Kenney et al, "A Condition Number for Point Matching with Application to Registration and Postregistration Error Estimation," IEEE Transactions on Pattern Analysis and Machine Intelligence, Nov. 2003, vol. 25, No. 11, pp. 1437-1454.

David G. Lowe, "Distinctive Image Features from Scale-Invariant Keypoints", International Journal of Computer Vision, 2004, vol. 60, No. 2, pp. 91-110.

Prabal Nandy et al, "Edge-Based Correlation Image Registration Algorithm for the Multispectral Thermal Imager (MTI)", Proceedings of SPIE, vol. 5425, pp. 197-207.

P. Pope et al, "Automated image registration (AIR) or MTI imagery", Proceedings of SPIE, 2003, vol. 5093, pp. 294-305.

Barbara Zitova et al, "Image registration methods: a survey", Image and Vision Computing 21, 2003, pp. 977-1000.

* cited by examiner

IMAGE REGISTRATION WITH UNCERTAINTY ANALYSIS

STATEMENT OF GOVERNMENT INTEREST

This invention was developed under Contract DE-AC04-94AL85000 between Sandia Corporation and the U.S. Department of Energy. The U.S. Government has certain rights in this invention.

BACKGROUND

Registration is a task in image processing involving matching of two or more images acquired, for example, at different times, from different sensors, or from different perspectives. Registration is typically used in many applications such as integration of information acquired from different sensors, detection of changes in images acquired at different times or under different conditions, assembly of three-dimensional information from images in conditions of movement of the camera or objects in the scene, model-based object recognition, and others. Registration of two images involves determination of a transformation so that individual points in one image can be mapped to a point in a second image.

Image registration may be defined as a mapping between two images. Typically, the mapping is spatial with respect to a parameter such as intensity. Brown, L. G., in "A survey of image registration techniques", *ACM Computing Surveys*, vol. 24, no. 2, pp. 325-376 (1992), describes image restoration theory in terms of analysis of two 2-dimensional array images $I_1$ and $I_2$. In Brown's example, the images $I_1(x,y)$ and $I_2(x,y)$ each map to respective intensity values. The mapping between images can be expressed as:

$$I_2(x,y)=g(I_1(f(x,y)))$$

where $f$ is a 2-dimensional spatial coordinate transformation, for example, $$(x',y')=f(x,y)$$

and g is a one-dimensional intensity or radiometric transformation.

A goal of registration is to determine optimal spatial and intensity transformations so that the images are matched with regard to a misregistration source. Generally, a key to an image registration solution is determination of spatial and geometric transformation. The spatial and geometric transformation can be expressed parametrically as two single-valued functions, $f_x, f_y$:

$$I_2(x,y)=I_1(f_x(x,y),(f_y(x,y)),$$

to enable a natural implementation. If the geometric transformation can be expressed as a pair of separable functions, for example such that two consecutive one-dimensional or scan-line operations can be used to compute the transformation $$f(x,y)=f_1(x) \circ f_2(y)$$

to promote efficiency. Generally, function $f_2$ is applied to each row, then function $f_2$ is applied to each column.

Image registration may be used in a wide variety of applications such as medical imaging, vehicular machine vision systems, imaging systems for manufacturing control, document system control using imaging, and many others. For example, medical imaging systems may include magnetic resonance imaging (MRI), x-ray computed tomography (CT), ultrasound imaging, nuclear imaging techniques such as positron emission tomography (PET) and single photon emission computed tomography (SPECT), and the like. Document handling systems often include scanners for conveying original documents to a scanning or input area.

Various image registration techniques have been developed. Many of the techniques address particular image registration problems. Existing image registration methods rarely involve a gauge of uncertainty associated with a solution and those that do generally rely on strict assumptions regarding the structure of data. Such assumptions are frequently violated in practical image registration applications.

SUMMARY

According to an embodiment of an image registration method, edges are detected in a first image and a second image. A percentage of edge pixels in a subset of the second image that are also edges in the first image shifted by a translation is calculated. A best registration point is calculated based on a maximum percentage of edges matched. In a predefined search region, all registration points other than the best registration point are identified that are not significantly worse than the best registration point according to a predetermined statistical criterion.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
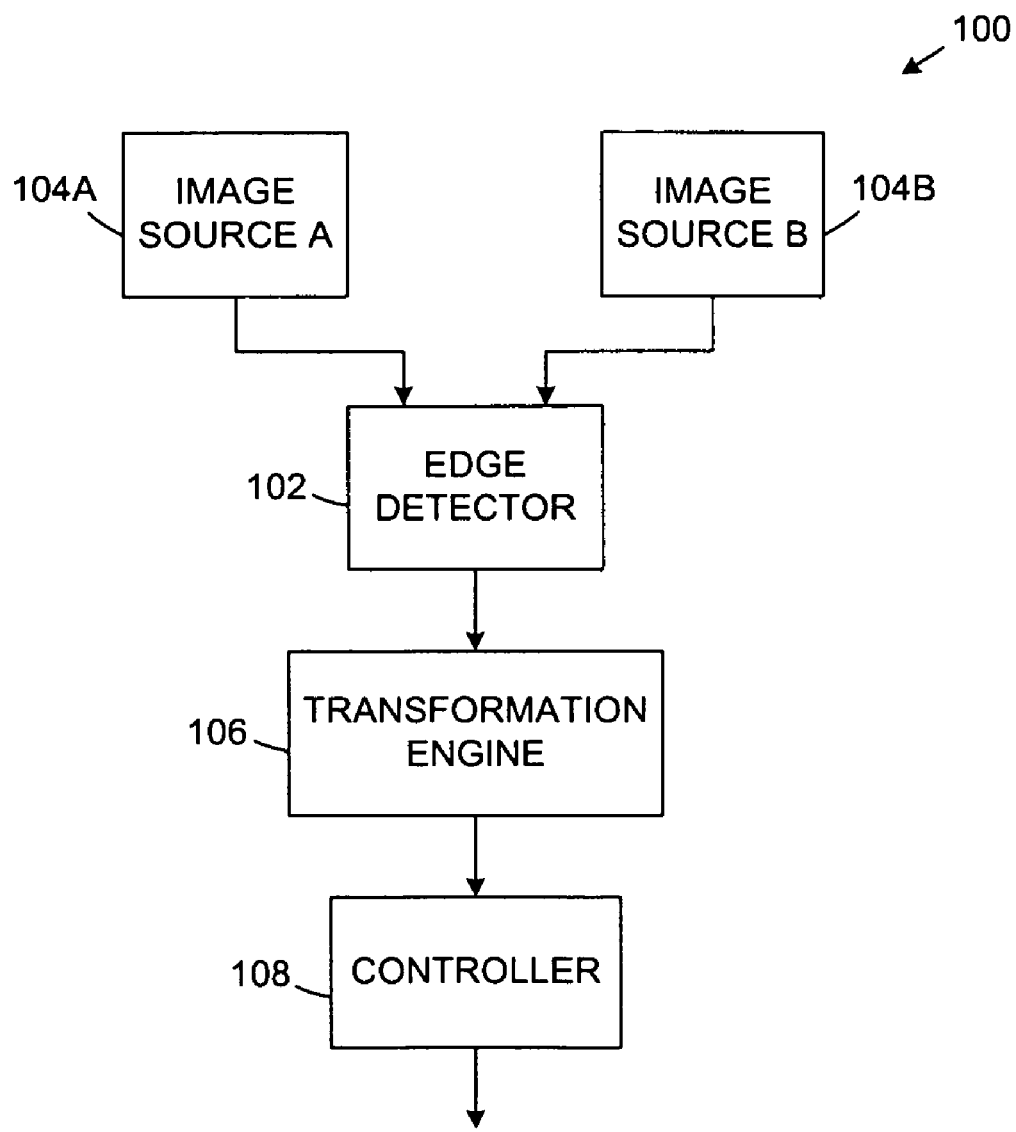
FIGS. 1A and 1B are schematic block diagrams depicting various embodiments of a system adapted for image registration.

A statistical technique for binary image registration includes uncertainty analysis. The technique is typically used to register two images of the same scene. Images may be acquired at different times, from different sensors, or from different viewing angles, for example.

One image registration technique using uncertainty analysis enables generation of well-defined statistical confidence regions in the space of candidate registration solutions. The technique uses statistical distribution of the cross-correlation of whitened sub-image samples or "chips" to develop registration confidence sets based on a two-sample t-test for a difference in correlation coefficients. The correlation-based approach works well in a variety of applications, but may be challenged by images that include high-frequency image artifacts, for example small patches of bad pixels, and by contrast reversals between images to be registered.

A further technique may be designed to improve performance in presence of factors such as high-frequency artifacts or contrast reversals. Edge detection can be applied to the input images prior to registration. In some implementations, the image registration technique comprises usage of a candidate translation (h,k) such that a row shift between images is h and a column shift is k where h and k are integers within a specified range of shifts. By definition, each of N pixels in a test subset is an edge in the second image. To test goodness of the translation (h,k), the percentage of the N pixels that are also edges in the first image, shifted by translation (h,k), is calculated. The percentage, called a match percentage, is denoted as the percentage p(h,k). The set of match percentages observed over the full set of candidate translations is used to make two determinations:

A first determination is whether the best observed match percentage is sufficiently high that confident registration can be achieved. A second determination is, in a well-defined statistical sense, what other candidate registration positions are "not significantly worse" than the position corresponding to the highest observed match percentage. A candidate translation is said to be "not significantly worse" than the best registration point whenever a statistical test applied to the observed edge matching data does not reject the null hypothesis of equal average match probabilities at the user specified level of significance. In comparing match percentages, a candidate registration position is "not significantly worse" than the best position whenever the observed match percentage at the candidate position is "not significantly lower" than the match percentage at the best position. One suitable statistical test for this determination in some embodiments is the McNemar statistical tests. Other suitable statistical tests include but are not limited to exact and approximate tests for a difference in binomial proportions.

The first determination is addressed by analyzing the best or highest match percentage observed over all of the translations tested. Translation (h*,k*) may be denoted as the translation resulting in the best match percentage such that percentage p(h*,k*) is greater than or equal to percentage p(h,k) for all candidate translations (h,k). The observed value of best percentage p(h*,k*) is compared to a pre-specified threshold value P* in a range of 0<P*≦1.0. If p(h*,k*) exceeds threshold P*, the match is considered sufficiently good to indicate confident registration. Otherwise, the solution is rejected. Rejection is likely to occur when edge positions have moved differentially between the two test images as will be the case if most of the edges represent structures that vary over time such as edges representing mobile cloud fronts rather than stationary geographic features.

When the first determination is found affirmatively, the second determination is analyzed. Specifically, although the translation (h*,k*) is found to give the highest observed match percentage, what is left to be determined is whether match percentages observed at other translations are "significantly" lower in a statistical sense. A mathematical model for the matching and registration process may be used to make the second determination.

The illustrative image registration technique may use a model whereby, at each selected edge pixel i, for i from 1 to N on the second image, the probability of a matching edge on the first image at translation (h,k) is given by $P_i(h,k)$. While the probabilities vary from pixel to pixel in a manner that is likely to be correlated, matches are assumed to be independent from one pixel to the next. In the model, an hypothesis test can be used to determine whether the match rate at translation (h,k) is significantly lower than that observed at translation (h*,k*). The null hypothesis of the test is that the average of the match probabilities over the N edge pixels are equal at translations (h,k) and (h*,k*). The alternative hypothesis is that the average match probability at translation (h*,k*) exceeds the average match probability at translation (h,k). In mathematical notation:

$$H_0: \sum_{i=1}^{N} P_i(h, k) = \sum_{i=1}^{N} P_i(h^*, k^*),$$

$$H_1: \sum_{i=1}^{N} P_i(h, k) < \sum_{i=1}^{N} P_i(h^*, k^*).$$

The test may be conducted at a level, denoted α, specified in advance by the user, and such that 0.0<α<1.0. Setting α equal to 5% is often standard, although other confidence levels may be selected. Acceptance or rejection of $H_0$ is based on the value of the McNemar test statistic as described in McNemar, Q., "Note on the sampling error of the difference between correlated proportions or percentages", *Psychometrika*, vol. 12, p. 153-157 (1947), and Lehmann, E L., *Nonparametrics: Statistical Methods Based on Ranks*, Holden-Day, Oakland, Calif. (1975). Random indicator variables $A_i$ and $B_i$ may be defined as follows:

$A_i$=1, if edge i is matched at translation (h*,k*) but not at (h,k)
$A_i$=0, otherwise
$B_i$=1, if edge i is matched at translation (h,k) but not at (h*,k*)
$B_i$=0, otherwise.

The McNemar statistic uses the sums of $\{A_i\}$ and $\{B_i\}$ over all N edge pixels in the test set. The first sum $\{A_i\}$ represents the total number of test edge pixels that were matched at translation (h*,k*) but not at translation (h,k). The second sum $\{B_i\}$ represents the total number of test edge pixels that were matched at translation (h,k) but not at translation (h*,k*). According to the definition of translation (h*,k*) as the translation resulting in the best match percentage, the first sum $\{A_i\}$ equals or exceeds the second sum $\{B_i\}$. The amount by which the first sum $\{A_i\}$ exceeds the second sum $\{B_i\}$, normalized by the square root of the number of edge pixels giving different results at the two offsets, can be used as a test statistic. In mathematical notation, the McNemar statistic is given by equation:

$$M = \frac{\sum_{i=1}^{N} A_i - \sum_{i=1}^{N} B_i}{\left[\sum_{i=1}^{N} A_i + \sum_{i=1}^{N} B_i\right]^{1/2}}.$$

When the denominator is relatively small, for example less than fifty or so, the distribution of M can be computed from the exact binomial model. The normal approximation to the binomial may be used when the denominator is large. In either case, the so-called "p-value" of the test is computed. The p-value is defined as the probability of obtaining a value of M equal to or greater than the observed value under a null hypothesis. The p-value is compared to level α, the specified confidence level of the test. If the p-value is greater than or equal to level α, the null hypothesis of equal match probabilities is not rejected, and the translation (h,k) is deemed to be "not significantly worse" than the translation (h*,k*). If the p-value is less than level α, hypothesis $H_0$ is rejected.

A 100×(1-α) % confidence set for the "best" translation point will contain translation (h*,k*) along with any other tested translations for which the null hypothesis of no difference in match probabilities is not rejected at level α. For level α=5%, such a set has an a priori probability of containing the "best" translation approximately equal to 95%. The approach ignores the issue of multiple comparisons, but the associated effect on the containment probability is expected to be small. Simulation studies confirm any biases in the procedure are very small.

Referring to FIG. 1A, a schematic block diagram depicts an embodiment of a system 100 adapted for image registration. The illustrative image registration technique operates on images transformed from grayscale to binary format by the application of an edge detector 102. System 100 comprises an edge detector 102 adapted to transform a first image 104A and a second image 104B from grayscale to binary format. For example, the edge detector 102 may map pixels representing edge locations to a logic one while mapping all other pixels to logic zero. The system 100 further comprises a transformation engine 106 adapted for register translation between edges in the first and second binary format images and a controller 108.

One example of a suitable edge detector 102 is described by Canny, J. in "A computational approach to edge detection", *IEEE Transactions on Pattern Analysis and Machine Intelligence*, Vol. PAMI-8, no. 6, p. 679-698 (1986). The Canny edge detector is suitable for usage in the illustrative image registration technique, although many other edge detectors are known and available. The illustrative image registration technique does not require usage of any particular method.

In an illustrative embodiment, the controller 108 is programmed to calculate a percentage of edge pixels in a subset of the second image that are also edges in the first image then determine a best registration point based on a maximum percentage of edges matched. The controller 108 identifies within a predefined search region all registration points other than the best registration point that are not significantly worse than the best registration point according to predetermined statistical criteria.

In an example implementation, a binary registration algorithm assumes that the transformation between images to be registered is a translation so that the space of candidate solutions is two-dimensional, representing a row shift and a column shift. The technique presumes that a user knows the range of permissible translations so that checking shifts within specified limits is sufficient. For example, a user may select limits of ±10 pixels in each dimension, or any other suitable range, for a particular application. In some embodiments, full pixel shifts are implemented. In other embodiments, sub-pixel precision may be attained by interpolating input images to a higher resolution prior to the edge detection step.

The transformation engine 106 is adapted to register translation over a subset of pixels identified as edges in the second image for a total of N edge pixels. The transformation engine 106 translates between the first and second images within a preselected range of shifts according to a candidate translation (h,k) with a row shift h and a column shift k. The controller 108 is further programmed to calculate a percentage p(h,k) of the N edge pixels that are also edges in the first image shifted by (h,k), analyze match percentages p(h,k) over a set of candidate translations (h,k), and determine whether a best match percentage is sufficiently high to enable confident registration. If so, the controller 108 statistically determines which candidate translations are not significantly worse than the best match percentage.

In a particular statistical determination, the controller 108 is programmed to determine a highest match percentage p(h*, k*) such that p(h*,k*)≧p(h,k) for all candidate translations (h,k), compare the highest match percentage p(h*,k*) to a preselected threshold value P* for 0<P*≦1, and designate highest match percentage p(h*,k*) as sufficiently high to enable confident registration for a highest match percentage p(h*,k*) that exceeds the threshold value P*.

In a particular implementation, the controller 108 is adapted to calculate a sum $A_i$ of a total number of edge pixels i which are matched at translation (h*,k*) of the highest match percentage p(h*,k*) but not at translation (h,k). The controller 108 further calculates a sum $B_i$ of a total number of edge pixels i which are matched at translation (h,k) but not at translation (h*,k*). The controller 108 then calculates a normalized test statistic M according to equation (1), as follows:

$$M = \frac{\sum_{i=1}^{N} A_i - \sum_{i=1}^{N} B_i}{\left[\sum_{i=1}^{N} A_i + \sum_{i=1}^{N} B_i\right]^{1/2}}, \quad (1)$$

and determines a p-value probability of obtaining a value of M which is equal to or greater than an observed value under a null hypothesis. The controller 108 compares the p-value probability to a selected confidence level and determines which candidate translations are not significantly worse than the best match percentage based on the p-value comparison.

In various implementations, the transformation engine 106 may be adapted to conduct a binary registration transformation as a two-dimensional translation comprising a row shift and a column shift. The controller 108 checks translations between within selected limits in full-pixel row and column shifts.

Registration is conducted over some subset of the pixels that are identified as edges in the second test image. Typically, the subset is derived from the union of a set of rectangular samples or chips, each containing a reasonable number of edge pixels derived from pertinent image scenes. For example, image scenes may be selected from coastlines, mountain ridges, rivers, roads, city skylines, building features, and other sharp features in the imaged scene. The combined set of rectangular chips is typically selected to contain edges from multiple distinct image features so that registration is not based on a single trait. The total number of edge pixels in the selected subset is denoted N.

In the illustrative embodiments, the transformation engine 106 conducts registration over a subset of pixels that are detected as edges in the second image with the subset derived from the union of the set of rectangular chips containing edge pixels derived from structures in a set of selected image scenes.

Figure 1B:
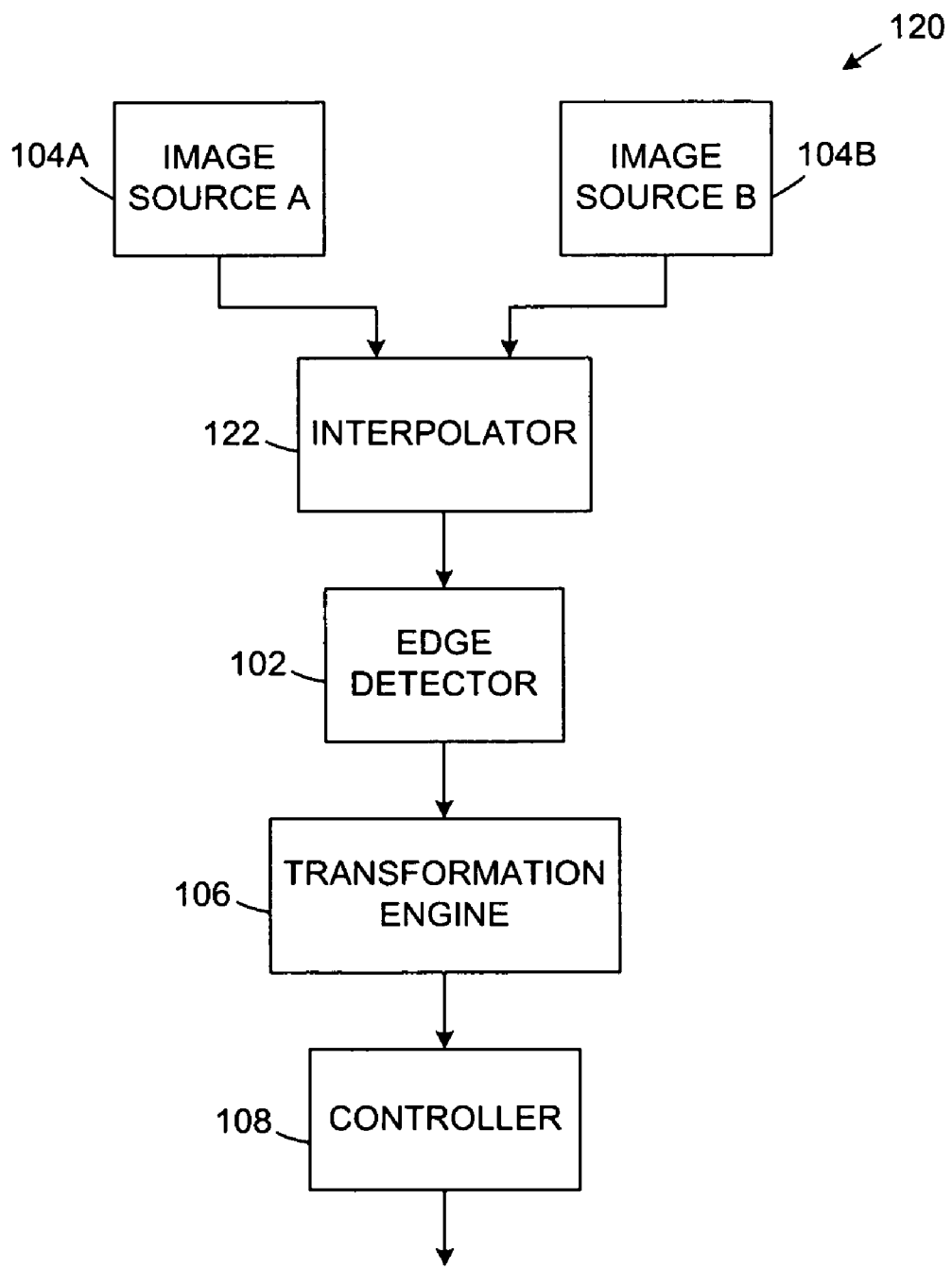

Referring to FIG. 1B, a schematic block diagram illustrates another embodiment of a system 120 adapted for image registration. In addition to an edge detector 102, the system 120 comprises the transformation engine 106 that is adapted to conduct a binary registration transformation as a two-dimensional translation comprising a row shift and a column shift. The controller 108 is adapted to check translations between within selected limits in a row shift and a column shift. The system 120 further may comprise an interpolator 122 that is configured to interpolate first and second grayscale images to an increased resolution prior to the edge detector 102 whereby the translations are checked to a sub-pixel precision.

Figure 2:
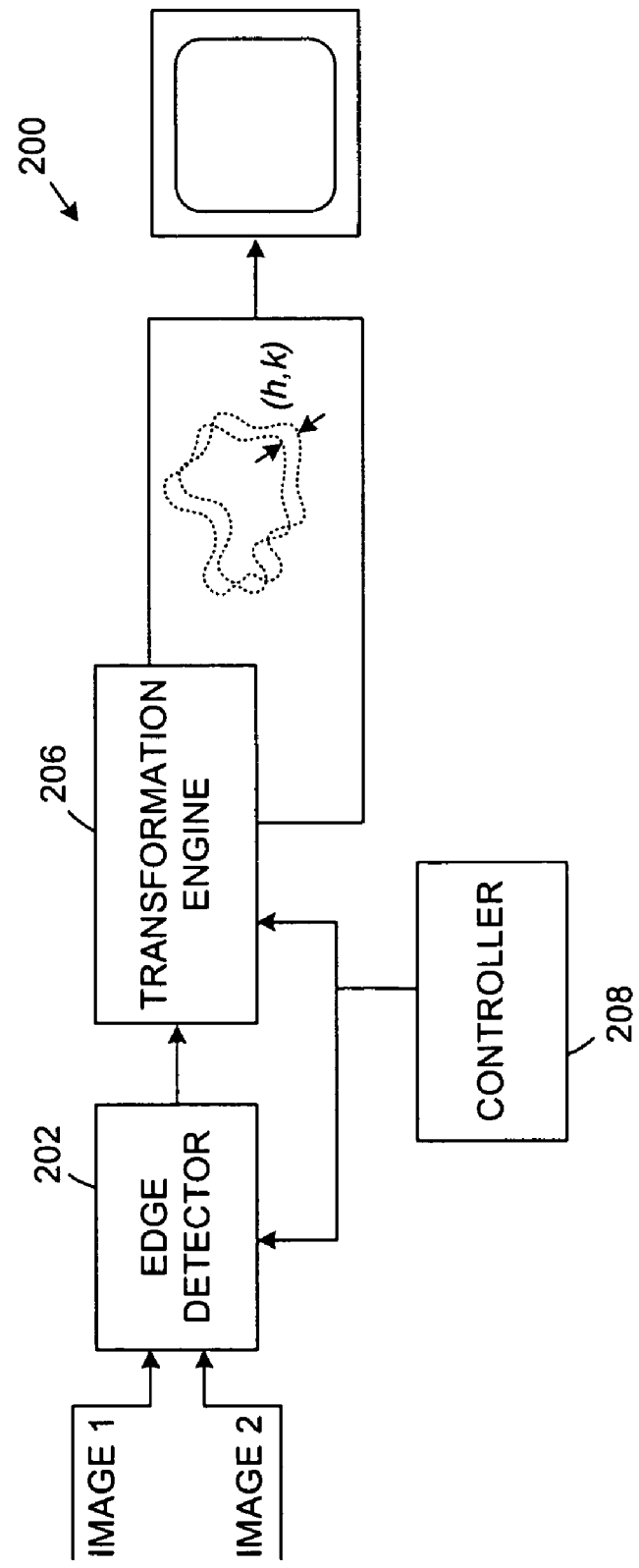
FIG. 2 is a schematic block diagram illustrating another embodiment of a system adapted for image registration.

Referring to FIG. 2, a schematic block diagram illustrates an embodiment of a system 200 adapted for image registration. The system 200 comprises an edge detector 202, a transformation engine 206 coupled to the edge detector 202, and a controller 208. The transformation engine 206 is adapted to receive first and second images from the edge detector 202 and to register translation over a subset of pixels identified as edges in the second image for a total of N edge pixels. The transformation engine 206 translates between the first and second images within a defined range of shifts according to a candidate translation (h,k) with a row shift h and a column shift k. The controller 208 is adapted to calculate a percentage p(h,k) of the N edge pixels that are also edges in the first image shifted by (h,k) and analyze match percentages p(h,k) over a set of candidate translations (h,k). The controller 208 determines whether a best match percentage is sufficiently high to enable confident registration, and if so, statistically determines which candidate translations are not significantly worse than the best match percentage.

Figure 3A:
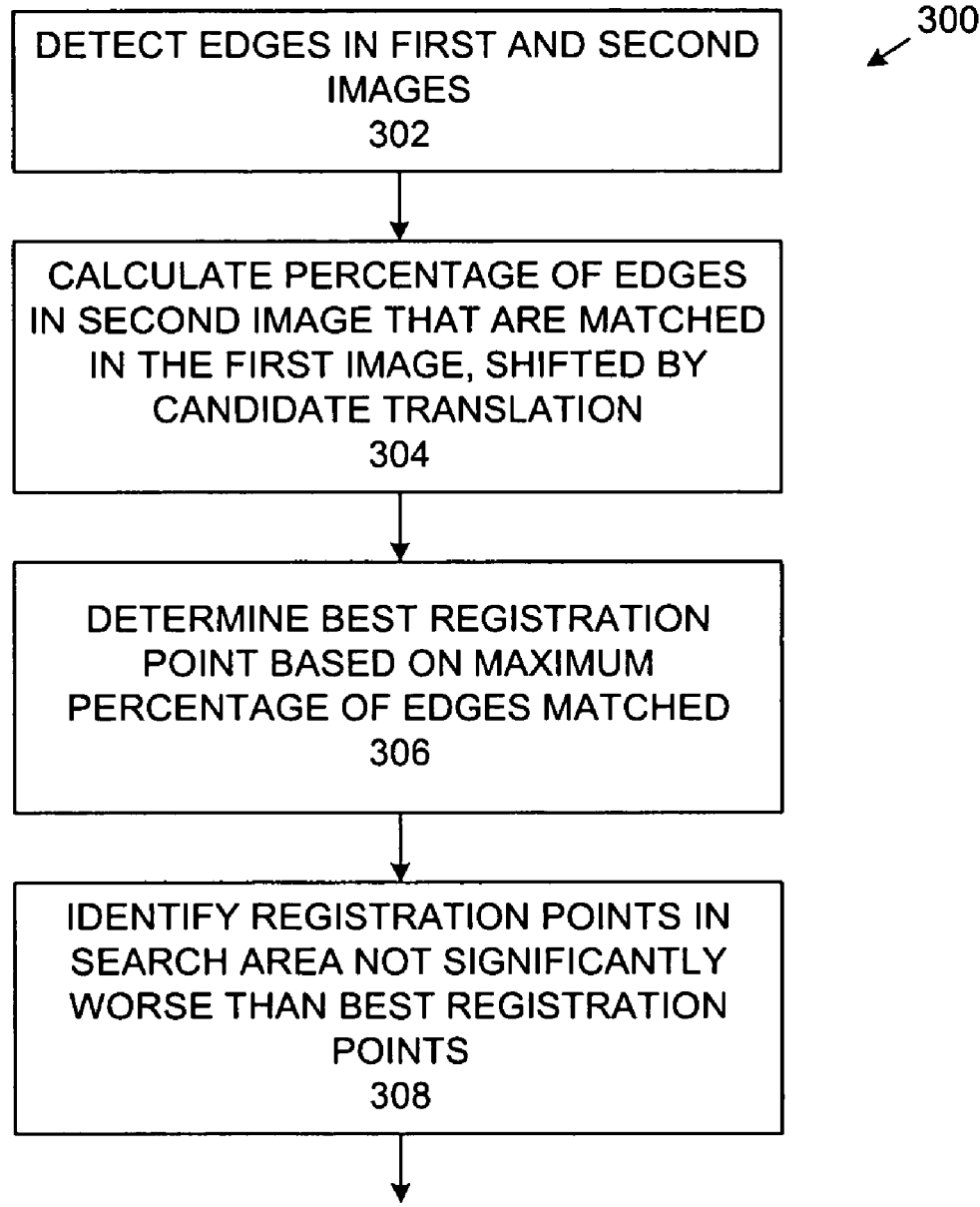
FIGS. 3A, 3B, 3C, 3D, and 3E are flow charts showing various embodiments and/or aspects of image registration methods.

Referring to FIG. 3A, a flow chart illustrates an embodiment of an image registration method 300. Edges are detected 302 in a first image and a second image. The percentage of edge pixels in a subset of the second image are calculated 304 that are also edges in the first image shifted by a translation. A best registration point is determined 306 based on a maximum percentage of edges matched. All registration points within a predefined search region other than the best registration point are identified 308 that are not significantly worse than the best registration point according to predetermined statistical criteria.

Figure 3B:
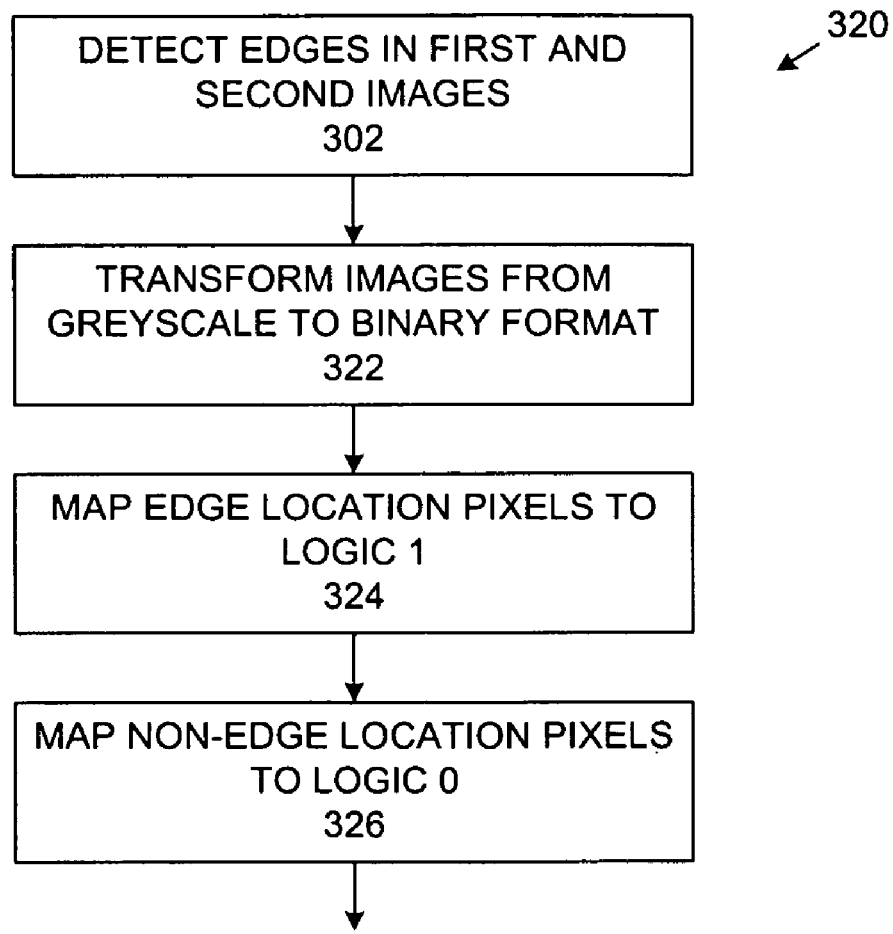

Referring to FIG. 3B, a flow chart shows another embodiment of an image registration method 320. Edges may be detected 302 and the first image and the second image are transformed 322 from grayscale to binary format by the edge detection. Pixels representing edge locations are mapped 324 to a logic one. Pixels representing other than the edge locations are mapped 326 to logic zero.

Figure 3C:
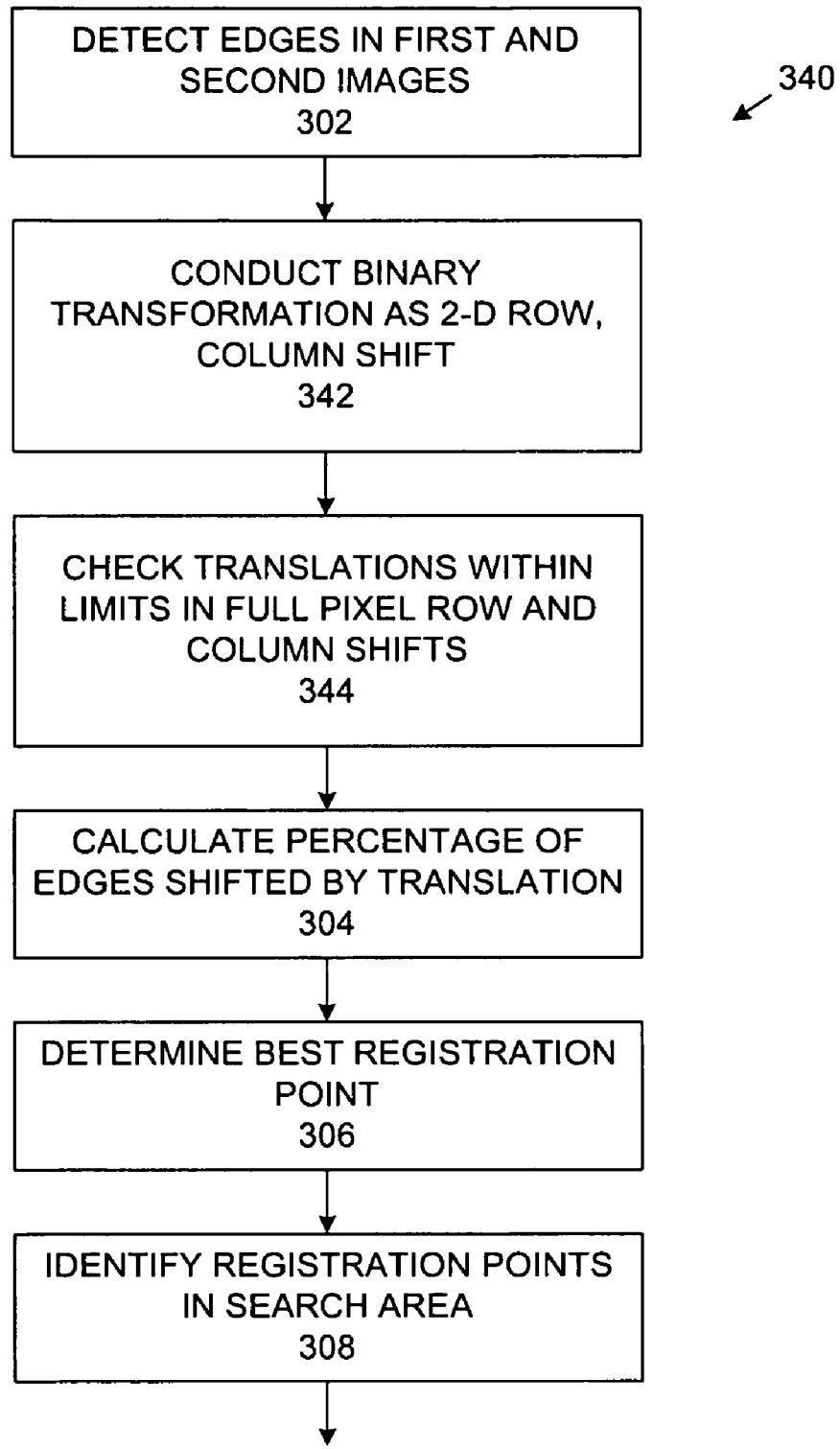

Referring to FIG. 3C, a flow chart shows another implementation of an image registration method 340. A binary registration transformation is conducted 342 as a two-dimensional translation comprising a row shift and a column shift. Translations are checked 344 between within selected limits in full-pixel row and column shifts.

Figure 3D:
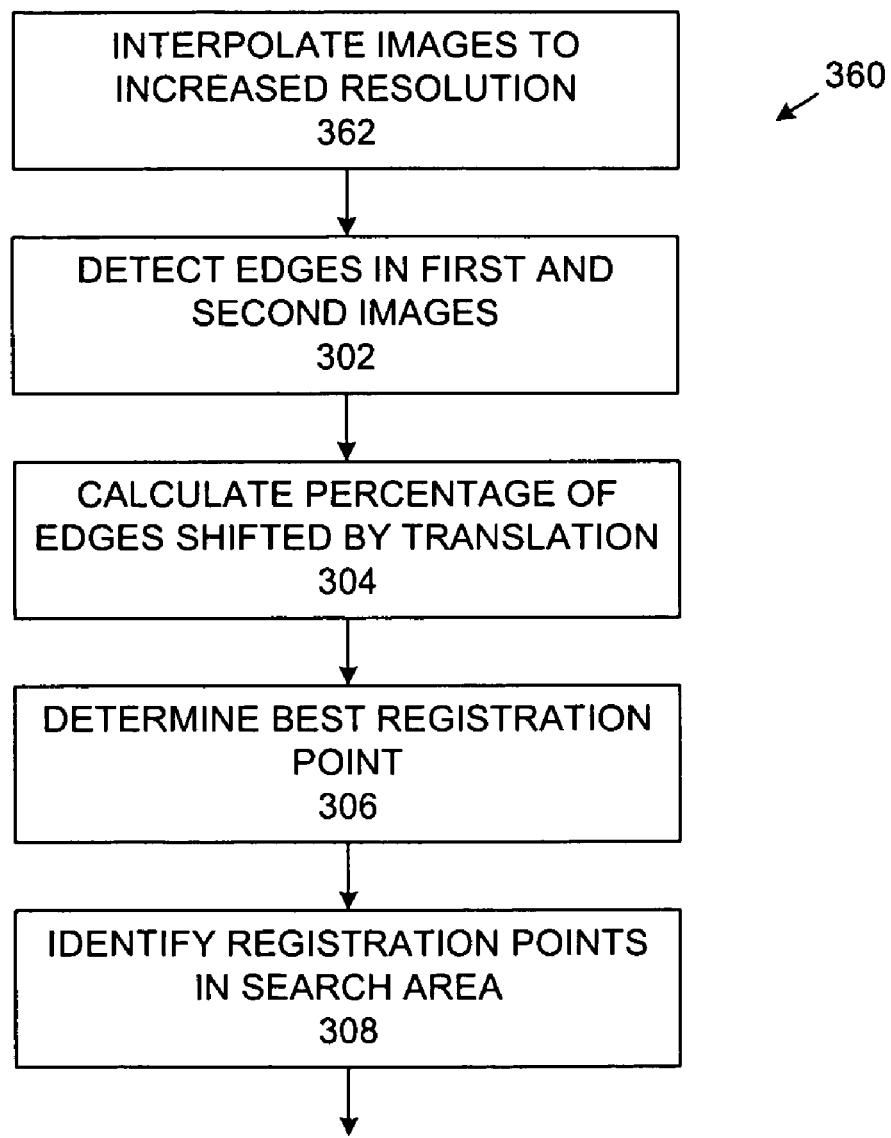

FIG. 3D is a flow chart depicting another embodiment of an image registration method 360 which increases resolution. The first image and the second image are interpolated 362 to an increased resolution prior to detecting edges 302 whereby the translations are checked to a sub-pixel precision.

Figure 3E:
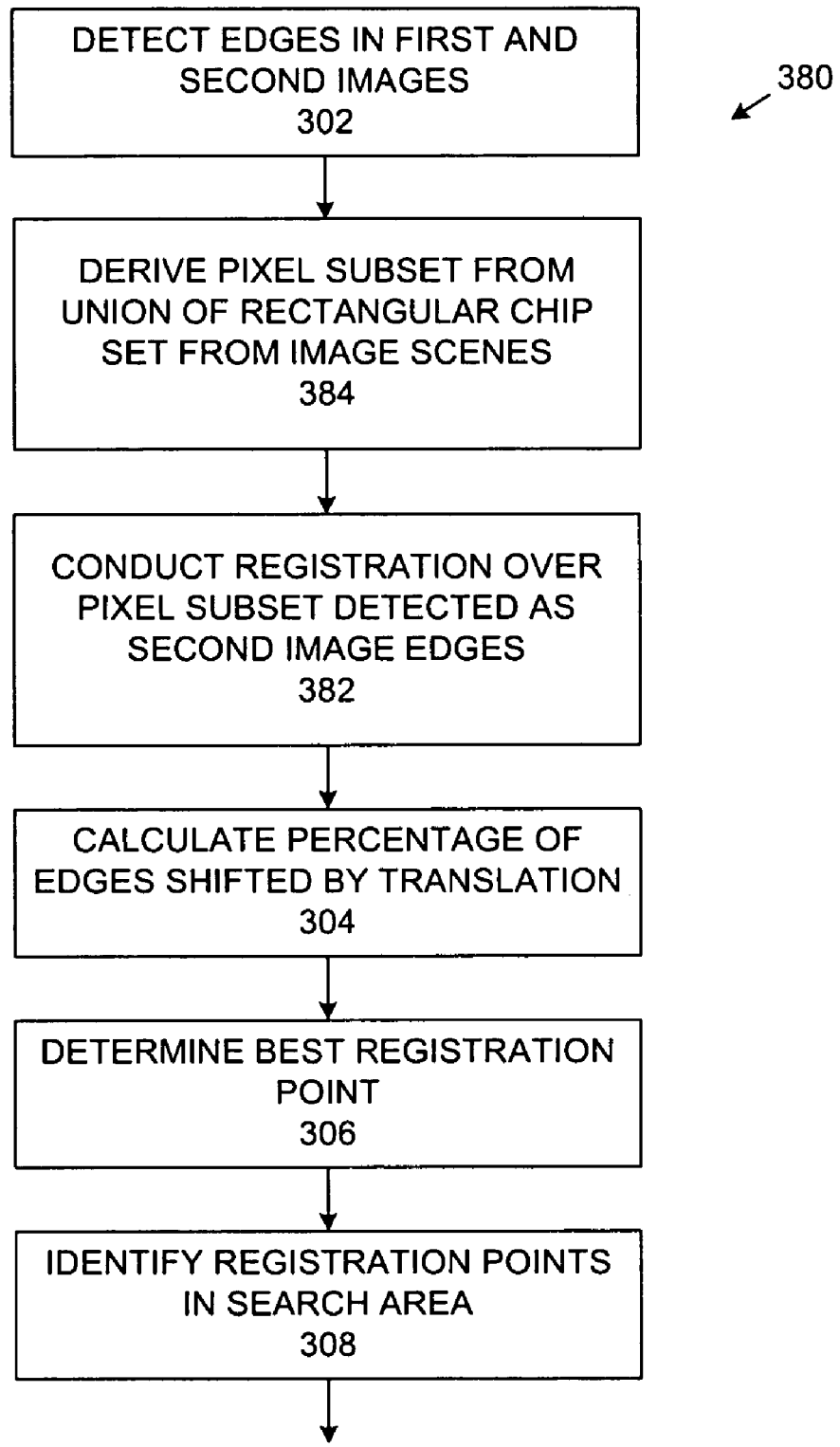

Referring to FIG. 3E, a flow chart shows another implementation of an image registration method 380. Registration is conducted 382 over a subset of pixels that are detected as edges in the second image. The subset is derived 384 from a union of a set of rectangular chips containing edge pixels derived from structures in a set of selected image scenes.

Figure 4A:
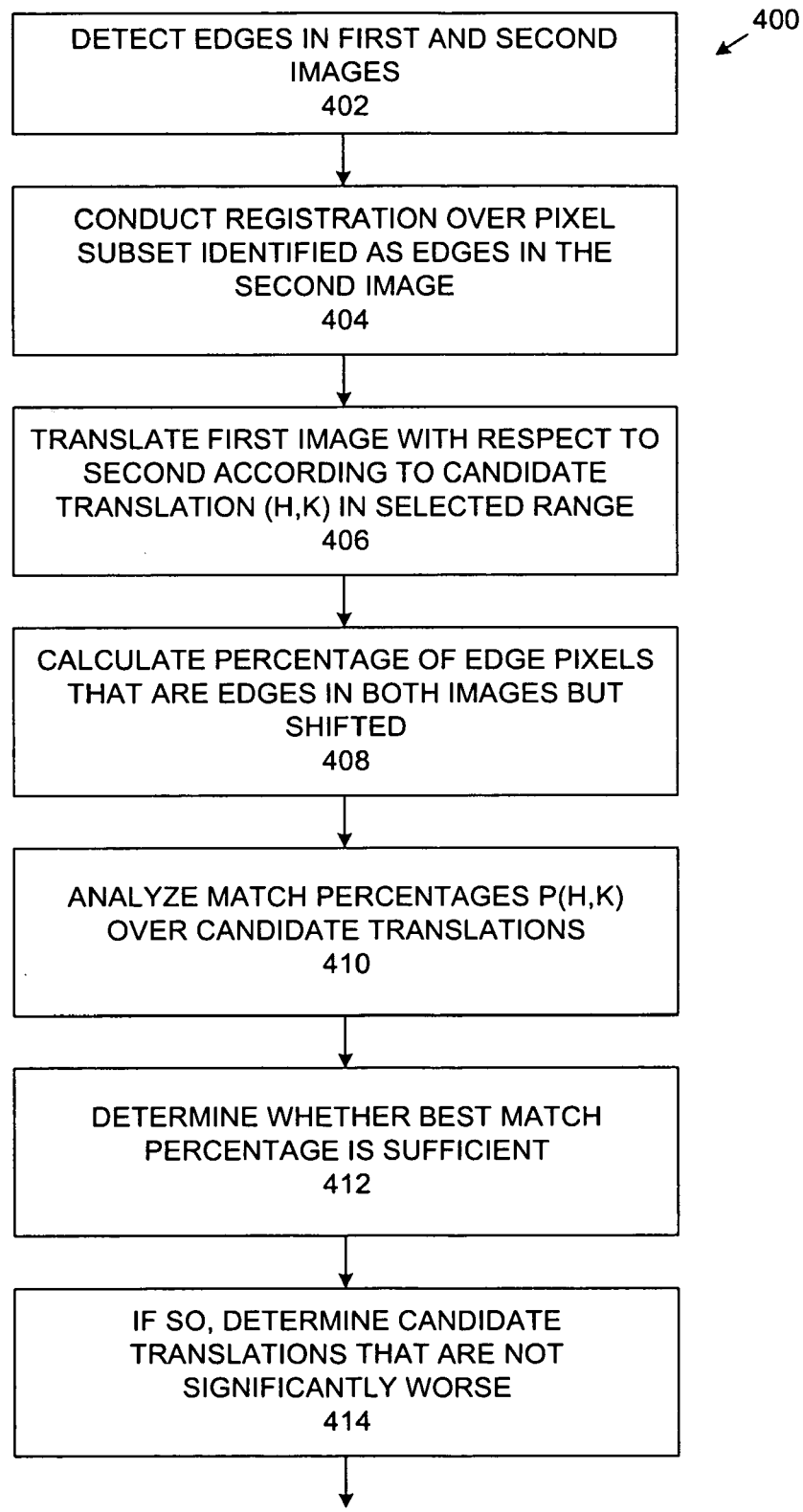
FIGS. 4A, 4B, and 4C are schematic flow charts depicting other embodiments and/or aspects of image registration methods.

Referring to FIG. 4A, a schematic flow chart depicts another embodiment of an image registration method 400. Edges are detected 402 in a first image and a second image. Registration is conducted 404 over a subset of pixels identified as edges in the second image for a total of N edge pixels. A candidate translation (h,k) with a row shift h and a column shift k between the first and second images is used to translate 406 within a preselected range of shifts. The percentage p(h, k) of the N edge pixels that are also edges in the first image shifted by (h,k) is calculated 408. Match percentages p(h,k) are analyzed 410 over a set of candidate translations (h,k). The method 400 further comprises determining 412 whether a best match percentage is sufficiently high to enable confident registration. If so, candidate translations that are not significantly worse than the best match percentage are statistically determined 414.

Figure 4B:
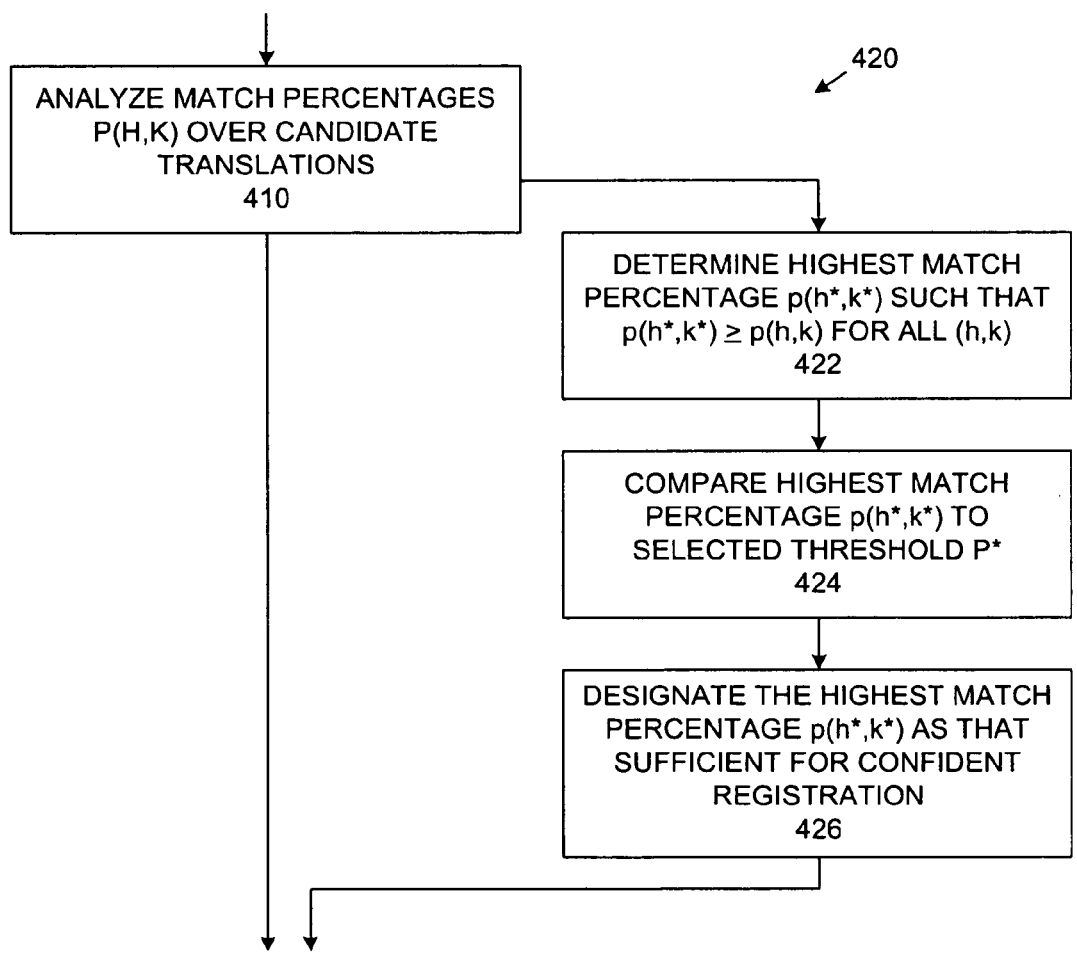

Referring to FIG. 4B, a flow chart illustrates an embodiment of a further image registration method 420. The highest match percentage p(h*,k*) is determined 422 such that p(h*,k*)≧p(h,k) for all candidate translations (h,k). The highest match percentage p(h*,k*) is compared 424 to a preselected threshold value P* for 0<P*≦1. The highest match percentage p(h*,k*) is designated 426 as sufficiently high to enable confident registration for a highest match percentage p(h*,k*) that exceeds the threshold value P*.

Figure 4C:
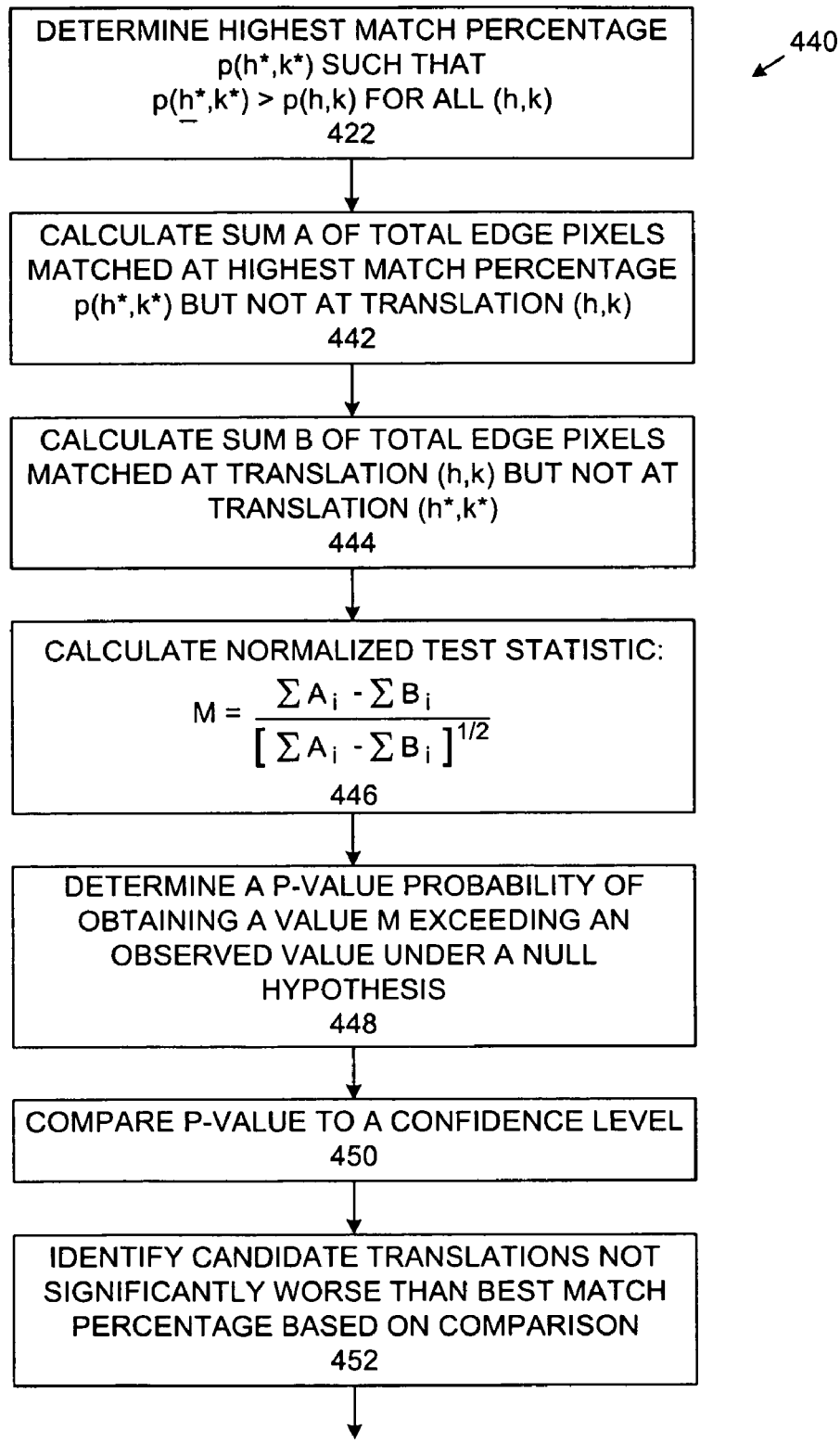

Referring to FIG. 4C, a schematic flow chart depicts a further embodiment of an image registration method 440. A sum $A_i$ of a total number of edge pixels i matched at translation (h*,k*) of the highest match percentage p(h*,k*) but not at translation (h,k) is calculated 442. Similarly, a sum $B_i$ of a total number of edge pixels i matched at translation (h,k) but not at translation (h*,k*) is calculated 444. Sums $A_i$ and $B_i$ may be used to calculate 446 a normalized test statistic M according to equation (2):

$$M = \frac{\sum_{i=1}^{N} A_i - \sum_{i=1}^{N} B_i}{\left[\sum_{i=1}^{N} A_i + \sum_{i=1}^{N} B_i\right]^{1/2}}. \tag{2}$$

A p-value probability of obtaining a value of M equal to or greater than an observed value under a null hypothesis is determined 448. The p-value is compared 450 to a confidence level. Candidate translations that are not significantly worse than the best match percentage are identified 452 based on the p-value comparison.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The disclosed method enables determination of the "best" registration point based on the maximum percentage of edges matched. The technique also enables identification all other registration points within a predefined search region that are not "significantly" worse than the best point in a well-defined statistical sense.

In various embodiments of this invention, the binary registration algorithm is designed for autonomous application with image pairs that are challenging due to a variety of quality issues, including (but not limited to) high frequency artifacts like salt-and-pepper noise, poor sensor focus, moderate-to-low sensor resolution, lack of strong geometric features, partial terrain obscuration, and contrast reversals. It can solve translation-only registration problems outright. Translation-only applications include image sequence stabilization to remove camera jitter; registration across different bands for multispectral sensors; and estimation of residual geolocation errors in satellite imagery that has already been corrected for spacecraft ephemeris, instrument alignment, and telescope pointing knowledge.

While embodiments of this invention do not solve for higher-order (rigid body, affine) transformations, the algorithm can be used to validate solutions obtained by other registration techniques that are designed to solve high-order transformations. Such high-order techniques often perform poorly in the presence of low quality imagery, and generally lack a reliable, internal measure of registration confidence that can be used as a rigorous gauge of performance. When high-order techniques must perform autonomously, post-solution validation via binary registration will enable automatic rejection of poorly-determined registration solutions. Applications include the stitching together of multiple images taken in the same general vicinity to create large mosaics, and registration of pairs of satellite images of the same Earth region taken at different times and viewing geometries.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although the illustrative embodiments express particular algorithms, methods, and equations, various other implementations may include different embodiments and expressions of the techniques and systems as delineated according to the claim language. Similarly, the embodiments may be used for a wide variety of imaging applications including but not limited to general imaging, security systems, control systems, document handling, medical imaging, satellite imaging, and remote sensing.

What is claimed is:

1. An image registration method comprising:
    acquiring a first image and a second image of a scene using a processor to perform the steps of:
        detecting edges in the first image and the second image;
        calculating a percentage of pixels corresponding to a detected edge in a subset of the second image that match a detected edge in the first image shifted by a translation;
        defining a best registration point based on a maximum percentage of edges matched;
        applying within a pre-defined search region an alpha-level statistical test of a null hypothesis that average match probabilities are equal between the best registration point and each remaining point in the pre-defined search region;
        using the alpha-level statistical test to identify all registration points within the pre-defined search region, other than the best registration point, that have a p-value exceeding a specified alpha level; and
        determining a 100(1-alpha) % statistical confidence set consisting of the best registration point and all other registration points having the p-value exceeding the specified alpha level, in the alpha-level statistical test of the null hypothesis.

2. An image registration method comprising:
    acquiring a first image and a second image of a scene using a processor to perform the steps of:
        detecting edges in the first image and the second image:
        conducting registration over a subset of pixels detected as edges in the second image for a total of N edge pixels;
        translating according to a candidate translation (h,k) with a row shift h and a column shift k between the first and second images within a user-selected range of shifts;
        calculating a percentage p(h,k) of the N edge pixels that also correspond to edges in the first image shifted by the candidate translation (h,k);
        analyzing match percentages p(h,k) over a set of the candidate translations (h,k) to generate a set of analyzed match percentages p(h,k);
        defining a maximum match percentage as a maximum of the set of analyzed match percentages p(h,k);
        defining a best registration point based on a maximum percentage of edges matched;
        determining whether the maximum match percentage enables registration at a predefined confidence level; and
        if the maximum match percentage enables registration, statistically determining which candidate translations (h,k) have match percentages p(h,k) that are not significantly lower than the maximum match percentage.

3. The method according to claim 2 further comprising:
    determining a maximum match percentage $p(h^*,k^*)$ such that $p(h^*,k^*) \geq p(h,k)$ for all candidate translations (h,k);
    comparing the maximum match percentage $p(h^*,k^*)$ to a threshold value $P^*$ for $0<P^*\leq 1$; and
    designating the maximum match percentage $p(h^*,k^*)$ as sufficient to enable confident registration for the maximum match percentage $p(h^*,k^*)$ that exceeds the threshold value $P^*$.

4. The method according to claim 3 further comprising:
    calculating a sum $A_i$ of a total number of pixels i corresponding to detected edges matched at a translation $(h^*,k^*)$ corresponding to the maximum match percentage $p(h^*,k^*)$ but not matched at the candidate translation (h,k);
    calculating a sum $B_i$ of a total number of pixels i corresponding to detected edges matched at a candidate translation (h,k) but not matched at the translation $(h^*,k^*)$;
    calculating a normalized test statistic M according to an equation:

$$M = \frac{\sum_{i=1}^{N} A_i - \sum_{i=1}^{N} B_i}{\left[\sum_{i=1}^{N} A_i + \sum_{i=1}^{N} B_i\right]^{1/2}};$$

determining a p-value probability of obtaining a value of M equal to or greater than an observed value under a null hypothesis;

comparing the p-value probability to a confidence level to generate a p-value comparison; and determining which candidate translations (h,k) have match percentages that are not significantly lower than the maximum match percentage p(h*,k*) as defined by the p-value comparison.

5. The method according to claim 1 further comprising:

transforming the first image and the second image from grayscale to binary format by the edge detecting step;

mapping to a logic value one pixels representing edge locations; and mapping to a logic value zero pixels representing other than the edge locations.

6. The method according to claim 1 further comprising:

conducting a binary registration transformation as a two-dimensional translation comprising a row shift and a column shift; and checking the two-dimensional translation within user-selected limits in full-pixel row and column shifts.

7. The method according to claim 1 further comprising:

conducting a binary registration transformation as a two-dimensional translation comprising a row shift and a column shift;

checking the two-dimensional translation within user-selected limits in the row shift and the column shift; and interpolating the first image and the second image to an increased resolution prior to detecting edges whereby the two-dimensional translation is checked to a sub-pixel precision.

8. The method according to claim 1 further comprising:

conducting registration over a subset of pixels that are detected as edges in the second image; and deriving the subset of pixels from a combination of sets of rectangular chips containing edge pixels derived from structures in a set of image scenes.

9. A system adapted for image registration comprising:

an edge detector adapted to transform a first grayscale image and a second grayscale image from grayscale to binary format to form a first binary format image and a second binary format image;

a transformation engine adapted to register translation between detected edges in the first binary format image and the second binary format image; and a controller adapted to calculate a percentage of pixels corresponding to a detected edge in a subset of the second binary format image that match a detected edge in the first binary format image shifted by a translation, define a best registration point according to a maximum percentage of edges matched, apply within a pre-defined search region an alpha-level statistical test of a null hypothesis that average match probabilities are equal between the best registration point and each remaining point in the pre-defined search region, use the alpha-level statistical test to identify all registration points within the pre-defined search region, other than the best registration point, that have a p-value exceeding a specified alpha level, and determine a 100(1−alpha) % statistical confidence set consisting of the best registration point and all other registration points having the p-value exceeding the specified alpha level, in the alpha-level statistical test of the null hypothesis.

10. A system adapted for image registration comprising:

an edge detector adapted to transform a first grayscale image and a second grayscale image from grayscale to binary format to form a first binary format image and a second binary format image;

a transformation engine adapted to register translation between detected edges in the first binary format image and the second binary format image, wherein the transformation engine is adapted to conduct registration over a subset of pixels detected as edges in the second image for a total of N edge pixels and translate according to a candidate translation (h,k) with a row shift h and a column shift k between the first and second images within a range of shifts; and a controller adapted to calculate a percentage of pixels corresponding to a detected edge in a subset of the second binary format image that match a detected edge in the first binary format image shifted by a translation, define a best registration point according to a maximum percentage of edges matched, apply within a search region an alpha-level statistical test of a null hypothesis that average match probabilities are equal between the best registration point and each remaining point in the search region, use the alpha-level statistical test to identify all registration points within the search region, other than the best registration point, that have a p-value exceeding a specified alpha level, and determine a 100 (1-alpha) % statistical confidence set consisting of the best registration point and all other registration points having the p-value exceeding the specified alpha level, in the alpha-level statistical test of the null hypothesis, wherein the controller is adapted to calculate a percentage p(h,k) of the N edge pixels that correspond to detected edges in the first image shifted by the candidate translation (h,k), analyze match percentages p(h,k) over a set of candidate translations (h,k) to generate analyzed match percentages p(h,k), define a maximum match percentage as a maximum of the analyzed match percentages p(h,k), determine whether the maximum match percentage enables registration, and if the maximum match percentage enables registration, statistically determine which candidate translations (h,k) have match percentages p(h,k) that are not significantly lower than the maximum match percentage.

11. The system according to claim 10 further comprising:

the controller adapted to determine a maximum match percentage p(h*,k*) such that p(h*,k*)≧p(h,k) for all candidate translations (h,k), compare the maximum match percentage p(h*,k*) to a threshold value P* for 0<P*≦1, and designate the maximum match percentage p(h*,k*) as sufficient to enable confident registration if the maximum match percentage p(h*,k*) exceeds the threshold value P*.

12. The system according to claim 11 further comprising:

the controller adapted to calculate a sum $A_i$ of a total number of pixels i corresponding to detected edges matched at a translation (h*,k*) corresponding to the maximum match percentage p(h*,k*) but not matched at a candidate translation (h,k), calculate a sum $B_i$ of a total number of pixels i corresponding to detected edges matched at the candidate translation (h,k) but not matched at the translation (h*,k*), calculate a normalized test statistic M according to an equation:

$$M = \frac{\sum_{i=1}^{N} A_i - \sum_{i=1}^{N} B_i}{\left[\sum_{i=1}^{N} A_i + \sum_{i=1}^{N} B_i\right]^{1/2}},$$

determine a p-value probability of obtaining a value of M equal to or greater than an observed value under a null hypothesis, compare the p-value probability to a user-specified confidence level to generate a p-value comparison, and determine which candidate translations have match percentages that are not significantly lower than the maximum match percentage p(h*,k*) as defined by the p-value comparison.

13. The system according to claim 9 further comprising:
the transformation engine adapted to conduct a binary registration transformation as a two-dimensional translation comprising a row shift and a column shift; and
the controller adapted to check translations within selected limits in full-pixel row and column shifts.

14. The system according to claim 9 further comprising:
the transformation engine adapted to conduct a binary registration transformation as a two-dimensional translation comprising a row shift and a column shift; and
the controller adapted to check translations within limits in the row shift and the column shift; and
an interpolator adapted to interpolate the first and second grayscale images to an increased resolution prior to the edge detector whereby the translations are checked to a sub-pixel precision.

15. The system according to claim 9 further comprising:
the transformation engine adapted to conduct registration over a subset of pixels that are detected as edges in the second grayscale image, the subset being derived from a union of a set of rectangular chips containing edge pixels derived from structures in a set of selected image scenes.

16. A system adapted for image registration comprising:
an edge detector;
a transformation engine coupled to the edge detector and adapted to receive a first image and a second image from the edge detector and to register translation over a subset of pixels detected as edges in the second image for a total of N edge pixels and translate according to a candidate translation (h,k) with a row shift h and a column shift k between the first image and the second image within a range of shifts; and
a controller adapted to calculate a percentage p(h,k) of the N edge pixels that match edges in the first image shifted by the candidate translation (h,k), analyze match percentages p(h,k) over a set of candidate translations (h,k), determine whether a maximum match percentage is sufficient to enable registration to a confidence level, apply if the maximum match percentage is sufficient an alpha-level statistical test of a null hypothesis that average match probabilities are equal between the best registration point and each remaining point in the pre-defined search region, use the alpha-level statistical test to identify all registration points within the pre-defined search region, other than the best registration point, that have a p-value exceeding a specified alpha level, and determine a 100(1-alpha) % statistical confidence set consisting of the best registration point and all other registration points having the p-value exceeding the specified alpha level, in the alpha-level statistical test of the null hypothesis.

* * * * *